Patented June 9, 1953

2,641,541

UNITED STATES PATENT OFFICE 2,641,541

PRODUCTION OF FIBER FROM FLAX STRAW

Sidney D. Wells, Combined Locks, Wis., assignor to The Institute of Paper Chemistry, Appleton, Wis., a corporation of Wisconsin No Drawing. Application September 13, 1949, Serial No. 115,549

4 Claims. (Cl. 92—15)

In general, the present invention relates to the production of fiber from flax straw and, more particularly, it relates to a process for producing substantially pure bast fiber from stalks of flax plants which are grown for seed purposes.

Many acres of flax are planted each year in various parts of the world to provide fiber and flax-seed which is used for linseed oil and other purposes. When flax is grown primarily for fiber, the highest grade product is obtained by harvesting the flax prior to the ripening of the seed and then effecting separation of the fiber from the stalk by a retting process. When this is done, the value of the seed crop is lost and, in addition, a substantial period of time is required to complete the separation of the useful fiber from the stalk.

When flax is grown for seed, flax straw, generally known as black straw, is produced as a by-product of the seed harvesting operation. This straw from the ripened plant has been thought to be commercially unuseable as a source of high grade fiber, and as a result, the straw has been frequently destroyed or otherwise used unproductively.

Black straw comprises shive, ligno-cellulose, and a rather substantial amount of useful bast fiber which if it can be separated from the other constituents of the straw, can be used for making paper and for other purposes. Various mechanical and chemical processes have been suggested for recovering bast fibers from flax plants grown for seed, but in general, these processes have failed to provide a bast fiber of sufficient purity and having the required physical strength for use in highest grade papers, such as bank note paper, currency paper, carbon copy paper, etc.

Certain of the mechanical processes for recovering bast fiber from flax straw, after the flax seed has been harvested, for example, the processes disclosed in my prior Patents No. 2,298,994 and No. 2,452,933, are economical in operation, and have provided bast fiber of sufficient purity for cigarette papers and papers of a lower grade. However, these known mechanical processes are only commercially practical for producing a product containing from 60 to 80% bast fiber. The manufacture of currency paper, on the other hand, requires a product containing less than 10 per cent non-bast materials.

Equally serious deficiencies are found in the known chemical processes. Extensive tests have shown that the degree of polymerization of the cellulosic molecules in the bast fiber is one of the important criteria of the paper making abilities of that fiber. These tests have indicated that the degree of polymerization in the bast fibers, before bleaching, should be above 1000 when measured by the TAPPI cupra ammonium viscosity method T206 m-44 and the conversion chart for the test published in 1948 by the Hercules Powder Company, if the paper made from the fiber is to meet the required standard for currency and bank note papers. However, the presently known chemical processes for treating flax straw result in a reduction of the degree of polymerization to such an extent as to make the resulting pulp product unsatisfactory for use in making such papers. In fact, some processes produce fiber having a degree of polymerization of about 600 or in some instances even less.

Accordingly, the principal object of the present invention is to provide an improved process for treating flax stalks, grown for seed, which will make possible the recovery of substantially pure bast fibers having a degree of polymerization sufficiently high to enable the use of the resultant fibers in papers of the highest grade.

General method

In general, my improved process contemplates as a starting material, the tow or fluff obtained from flax grown for seed purposes by a mechanical working of the black straw. The tow or fluff desirably contains over 60% bast fiber and is preferably produced by one of my aforementioned patented mechanical processes. This tow is then treated with an aqueous sodium hydroxide solution having an average normality of about .075 for a period of from about 48 to about 96 hours, the normality of the solution being maintained below .15 at all times during the treatment period.

The chemical treatment of the tow may comprise a number of successive sodium hydroxide treatments, each successive treatment employing a sodium hydroxide solution of increasing concentration. However, the concentration of hydroxide should average about .075N over the entire process and should not exceed .15N. For example, the tow may be placed in a tank and treated with a .05N sodium hydroxide solution for 24 hours, the spent solution being drained from the tow at the end of the treatment period.

The partially treated tow may then be reimmersed in a .1N caustic soda solution for a second 24 hours, effecting an average concentration in this step of about .075N. Finally, the tow, after the .1N step, is immersed in a .15N solution of sodium hydroxide for a third 24 hour period. The average concentration of caustic in the first or dilute treatment step is about .025N, in the second step, as pointed out, the average concentration is about .075N, and in the final step the concentration of the sodium hydroxide solution is about .125N. Thus, the average concentration during the process is about .075N.

Somewhat more economical operation of the process may be achieved by passing a .15N sodium hydroxide solution countercurrently through the tow so that the resulting solution is substantially spent at the end of the 72 hour period and an average normality of about .075N is maintained.

The temperature of the sodium hydroxide solution is also important and should be maintained below about 80° F. and preferably between 50° F. and 80° F. Under the above described conditions of concentration, temperature and time, the treated tow, before chlorination and bleaching, will have a degree of polymerization of between 1000 and 1800 when measured by the TAPPI method. It will be noted that this degree of polymerization is substantially above that provided by other chemical processes which under ordinary conditions so degrade the pulp as to provide a degree of polymerization of less than about 800 when measured by the above method.

After the tow or fluff has been subjected to the dilute sodium hydroxide solutions for the desired length of time, the chemically treated tow is subjected to attrition in a rod mill, paper beater, disintegrator, or the like to break the bast fibers free from any residual shive or other non-bast materials. The beaten pulp is then washed with water in any of the conventional washing engines of the type found in rag paper mills, this operation removing a substantial portion of the non-bast materials which were in the pulp during the chemical treatment.

In order to remove the remaining non-bast materials from the useful fiber, the pulp obtained from the washing engine is dispersed in water. The dispersion comprises from about 0.1 to 1.0 parts by weight of pulp to each 100 parts by weight of water. The suspended bast fiber is then separated from any remaining shive or other unwanted material by centrifugal means, as for example, by a centrifuge, or a vortex or centrifugal eliminator. In this connection, I have discovered that the chemical treatment of the tow in the manner described in the foregoing does not substantially reduce the amount of air entrapped in the lumen or cells of the bast fiber but causes the shive to become water logged. This selective water-logging of the shive causes a substantial difference in density between the bast and other materials. The pulp remaining after the centrifuging of the aqueous solution comprises well above 90 per cent bast fiber and is suitable for bleaching and manufacture into highest grade paper.

Specific method

As a specific example of my previously mentioned process, flax tow was obtained by the method of my prior Patent No. 2,452,933 from the flax straw which remained after the flax seeds had been harvested. This tow contained about 70 per cent bast fiber and had not been given any prior chemical treatment, the separation having been effected by decortication and pneumatic classification.

A batch of this flax tow was placed in a tank and immersed in a .05N sodium hydroxide solution which was maintained at about 70° F. The batch was allowed to stand for about 24 hours. After the 24 hour period, the exhausted .05N solution was replaced by a .1N sodium hydroxide solution which was also maintained at a temperature of about 70° F. After the second 24 hour period, the partially exhausted .1N solution was drained from the tow and a .15N sodium hydroxide solution was pumped over the tow and was allowed to react with the two for a period of 24 hours and drained from the tank, the temperature of this solution also being maintained at about 70° F.

The soaking in the dilute caustic softened the bond between the remaining shive and the useful bast fibers. The drained tow after the third soaking period was passed through a disc refiner which acted to break the bast fibers free from the residual shive and pithy portions of the straw.

The fiber, after passing through the disc refiner, was then thoroughly washed in a washing engine of the type used in rag paper mills, to remove a substantial portion of the non-bast material. The washed pulp, which then contained about 90 per cent bast fiber, was dispersed in water to provide a dispersion containing about 0.5 part of fiber by weight to each 100 parts of water. The dispersion was then passed through a vortex-eliminator of the type shown in the patent to Freeman, No. 2,102,525 which was issued on December 14, 1937. In the eliminator, the water logged shive was separated from the bast fibers which are buoyed up by the air entrapped by the lumen of the fiber. The fiber pulp which resulted from the foregoing procedure contained only about 5 per cent of impurities and, in addition, the fibers had a degree of polymerization of about 1,200. This fiber was then chlorinated, washed, caustic extracted, washed, and bleached in the usual manner and was used in making paper in place of linen fibers obtained from rags.

In the foregoing, there has been described an improved method for obtaining bast fiber from flax straw. As has been pointed out, the described process provides a very economical and highly satisfactory product which may be effectively substituted for linen rags and linen cuttings in the manufacture of highest grade paper. Various of the features of my invention which are believed to be new are set forth in the appended claims.

I claim:

1. The method of producing bast fibers containing less than 10 per cent non-bast materials and having a degree of polymerization greater than 1000 before bleaching, comprising the steps of soaking flax tow, containing over 60 per cent bast fibers, in a sodium hydroxide solution having a concentration less than .15N for a period of from about 48 to 96 hours, said solution being maintained at a temperature of less than about 80° F., then subjecting said tow to attrition to break the bast fibers free from non-bast materials, dispersing the bast and non-bast materials in water, and subjecting the dispersion to centrifugal forces to effect separation of non-bast materials from the bast fibers.

2. The method of obtaining bast fibers from black straw, the bast fibers containing less than 10 per cent non-bast materials and having a degree of polymerization greater than 1000 before bleaching, comprising the steps of mechanically working black straw, separating the mechanically worked straw to produce a tow containing over 60 per cent bast fiber, soaking the tow in a sodium hydroxide solution having a concentration less than .15N for a period of from about 48 to 96 hours, said solution being maintained at a temperature of less than about 80° F., then subjecting said tow to attrition to break the bast fibers free from non-bast materials, washing the tow to remove a substantial portion of the non-bast materials and provide a pulp, dispersing the pulp in water, and subjecting the dispersion to centrifugal forces to effect separation of non-bast materials from bast fibers.

3. The method of producing bast fibers containing less than 10 per cent non-bast materials having a degree of polymerization greater than 1000 before bleaching, comprising the steps of soaking flax tow which contains over 60 per cent bast fiber in a sodium hydroxide solution having an average concentration of about .075N and a maximum concentration of .15N for a period of from about 48 to 96 hours, said solution being maintained at a temperature of less than about 80° F., removing said sodium hydroxide solution from said tow, then subjecting said tow to attrition to break the bast fibers free from non-bast materials to produce a pulp, washing said pulp to remove a substantial portion of said non-bast materials, dispersing between .1 and 1.0 parts, by weight, of the washed pulp in each 100 parts, by weight, of water, and subjecting the dispersion to centrifugal forces to effect further removal of the non-bast materials.

4. The method of producing bast fibers containing less than 10 per cent non-bast materials and having a degree of polymerization in excess of 1000 before bleaching, comprising the steps of immersing flax tow, containing over 60 per cent bast fiber, in a .05N sodium hydroxide solution for about 24 hours, removing the solution from said tow, re-immersing the tow in 1N sodium hydroxide solution for about 24 hours, removing the solution from said tow, re-immersing the tow in .15N sodium hydroxide solution for about 24 hours, removing the solution from said tow, said sodium hydroxide solutions being maintained at a temperature of about 70° F., subjecting the chemically treated tow to attrition to break the bonds between the bast and non-bast materials and produce a pulp, washing said pulp to remove a substantial portion of non-bast materials, dispersing .5 part, by weight, of said pulp in each 100 parts, by weight, of water, and subjecting the dispersion to centrifugal forces to effect further removal of the non-bast materials from the bast fibers.

SIDNEY D. WELLS.

References Cited in the file of this patent

UNITED STATES PATENTS

| Number | Name | Date |
|---|---|---|
| 8,134 | Claussen | June 3, 1851 |
| 1,405,946 | Shartle | Feb. 7, 1922 |
| 1,850,791 | Drewsen | Mar. 22, 1932 |
| 2,060,685 | Murphy | Nov. 10, 1936 |
| 2,128,928 | Estes | Sept. 6, 1938 |
| 2,129,789 | Seaborne | Sept. 13, 1938 |
| 2,164,040 | Offermanns | June 27, 1939 |
| 2,312,545 | Haug | Mar. 2, 1943 |
| 2,434,449 | Wells | Jan. 13, 1948 |

OTHER REFERENCES

Chemistry of Pulp and Paper Making by Sutermeister, 3rd ed. pgs. 85 and 86 (1941), published by John Wiley and Sons, New York.